UNITED STATES PATENT OFFICE.

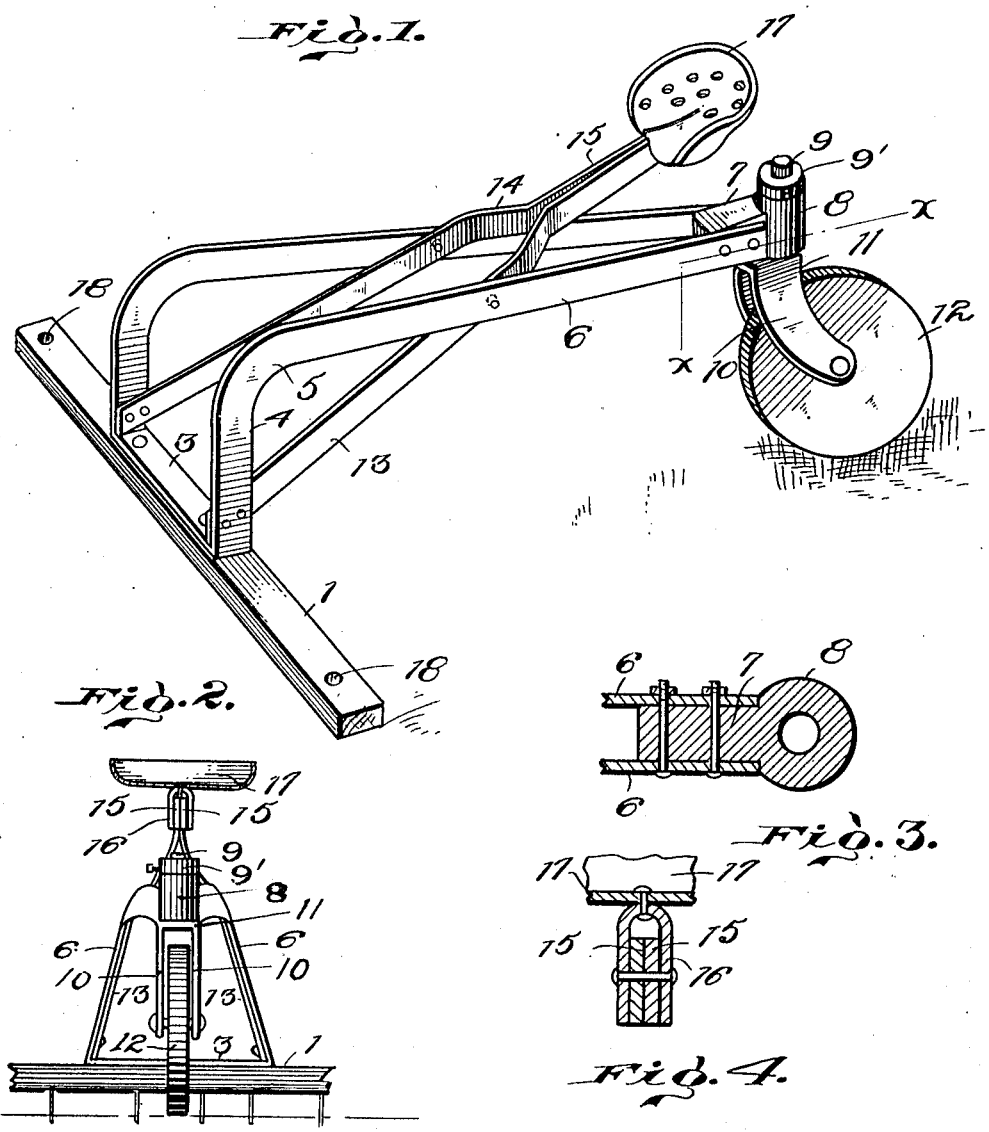

DANIEL B. FRISBY, OF BRISTOW, IOWA.

HARROW-CART.

991,966.

Specification of Letters Patent.

Patented May 9, 1911.

Application filed July 2, 1910. Serial No. 570,119.

*To all whom it may concern:*

Be it known that I, DANIEL B. FRISBY, a citizen of the United States, residing at Bristow, in the county of Butler and State of Iowa, have invented certain new and useful Improvements in Harrow-Carts, of which the following is a specification, reference being had therein to the accompanying drawing.

This invention relates to harrows and has special reference to wheel harrows, which are provided with a seat mounted on a wheel frame whereby the person driving the harrow may ride instead of walk.

The invention has for its object to provide an improved wheel harrow of this kind constructed and arranged as hereinafter set forth and claimed.

Referring to the accompanying drawing, Figure 1 is a view in perspective of a wheel harrow constructed in accordance with this invention. Fig. 2 is a rear end view thereof. Fig. 3 is an enlarged detail view on horizontal section on line $x$—$x$ of Fig. 1. Fig. 4 is a detail view in vertical section showing the connections of the seat with the frame.

In the accompanying drawing 1 indicates the evener bar which is secured to a suitable frame that is here shown, preferably consisting of a strip of metal bent to form a horizontal portion 3 to which the bar 1 is riveted or bolted, and the upright portions 4 with the curved portions 5 and the horizontal converging portions 6 secured at their rear end to a neck 7 of a vertical tubular member 8 through which projects the pivot pin 9 of the arms 10 of a U-shaped member 11, in which is pivotally mounted the caster wheel 12. The pin 9 is held in place by a suitable collar 9'. To the lower ends of the vertical portions 4 of the frame, are riveted one end of the diagonal upwardly extending bars 13, which are riveted to the horizontal bars 6, and have converging portions 14, and the converging upwardly extending portions 15 riveted at their outer ends to a depending U-shaped member 16 which is riveted to the driver's seat 17.

The frame herein described is preferably formed of sheet metal and affords a light, simple durable frame adapted to support the weight of the driver. The several strips of the frame are edge upward to form a strong frame to support the weight of the driver.

It will be seen that by means of this construction the team which is hitched to the harrow in any suitable manner may be driven by the driver sitting in the seat 17, the caster wheel 12 serving not only as a support to the frame, but automatically following the direction of the harrow as it is guided by the driver. The bar 1 is fastened to the evener of the harrow in front of the latter in any suitable manner as for example by means of bolts which engage the bolt holes 18 in the bar 1.

Having described the invention, I claim:

1. A wheel harrow comprising an evener bar, a frame formed with a horizontal portion secured to said evener bar, vertical portions projecting from said horizontal portion, and horizontal rearwardly extending and converging portions connected with said vertical portions, a caster wheel pivotally mounted on and supporting the rear end of said horizontal portions, and a pair of diagonal upwardly extending metallic bars placed on edge and secured to said vertical and horizontal portions of said frame and connected together at their outer ends, and a driver's seat mounted on said outer ends.

2. A wheel harrow consisting of an evener bar, a frame consisting of a metallic strip mounted on edge and secured to said evener bar and formed with a horizontal portion, upright portions and horizontally rearwardly extending converging portions, a support riveted to said horizontal portion, a yoke pivotally mounted in said support, a wheel pivotally mounted on said yoke and a pair of converging metallic strips on edge secured at one end to said vertical portions of the frame, and also secured to the horizontal portion of the frame and having rearwardly and upwardly projecting parallel portions, and a seat mounted on said upwardly projecting parallel portions.

In testimony whereof I hereunto affix my signature in presence of two witnesses.

DANIEL B. FRISBY.

Witnesses:
F. T. WELLS,
W. A. RICHARDS.

Copies of this patent may be obtained for five cents each, by addressing the "Commissioner of Patents, Washington, D. C."